INVENTOR.
ABRAHAM M. FUCHS

United States Patent Office 3,439,269
Patented Apr. 15, 1969

3,439,269
MULTICHANNEL ANALOG ANALYZER
Abraham M. Fuchs, Rydal, Pa., assignor to Weston Instruments, Inc., Newark, N.J., a corporation of Delaware
Filed Dec. 30, 1966, Ser. No. 606,266
Int. Cl. G01r 23/16
U.S. Cl. 324—77
11 Claims

ABSTRACT OF THE DISCLOSURE

A power spectrum analyzer for two time varying input signals having a large plurality of channels of analysis, with each channel corresponding to analysis at a differing analysis frequency. Each channel provides channel output signals corresponding to the Fourier transform of the input signals at the respective analysis frequency. The remaining processing is carried on by a sampling system which computes individual values at each analysis frequency of input power spectral density of the two signals and the copower and quadrature power components of cross power spectral density.

---

Figure 1:
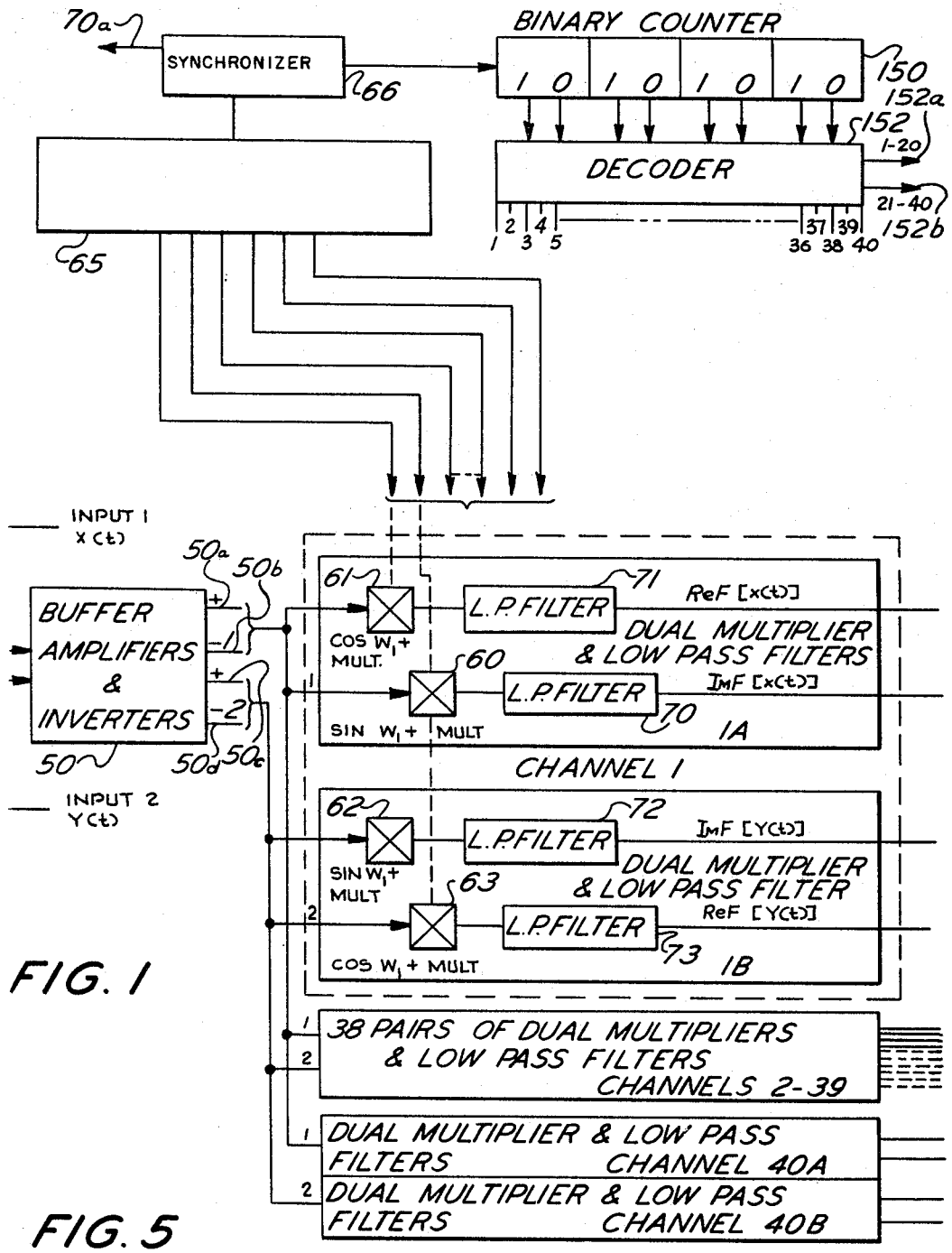

This invention relates to power and cross power spectrum analyzers having a plurality of analysis channels. Power spectrum analyzers have been used with time varying random and periodic function signal inputs. In general, these signals comprise a plurality of frequencies superimposed one on another. The spectrum analyzer has the basic function of resolving which frequencies are the most prominent, that is which frequencies have the most power content. The power spectrum of a signal at a frequency $w_0$ over a bandwidth $\pm \Delta w$ is the average of the energy in the signal at this frequency and over this bandwidth. For example, a frequency-power profile of a band of time varying signals may be computed.

A first time varying signal $x(t)$ may be an input to a system under test and a second time varying signal $y(t)$ may be the output of that system. The cross power of the first and second signals at a selected frequency of analysis $w_0$ over a bandwidth $\pm \Delta w$, is the average of the energy in the product of the two signals at $w_0$ and over the foregoing bandwidth. Accordingly, cross power spectrum analysis rejects all energy in the resultant which is not from the same source. Cross power analyzers are described in detail in WADC Technical Reports, 59–241, Survey of Analog Cross-Spectral Analyzers, Wright Air Development Division, Wright-Patterson AFB, December 1959.

Prior power and cross power spectrum analyzers have computed spectrum analysis automatically analysis frequency by analysis frequency. Thus, the time varying signals are analyzed at one desired analysis frequency, after which the frequency is changed and another analysis operation is performed at the new frequency of analysis. The foregoing may take place over a plurality of analysis frequencies with each computation being performed in turn. It has been desired to analyze time varying signals simultaneously over a large plurality of differing frequencies of analysis. In this manner, a large plurality of spectral densities computed at differing analysis frequencies may be continuously monitored. However, in order to achieve this result, an individual cross power analyzer has been required for each analysis frequency desired with the resultant structure being extremely expensive and complex.

Accordingly, an object of the present invention is a power and a cross power spectrum analyzer for analyzing time varying signals over a plurality of analysis frequencies and utilizing a sampling system to substantially decrease the system complexity.

In accordance with the present invention in one form thereof, there is provided a power spectrum analyzer for first and second input signals having a large plurality of channels of analysis with each channel corresponding to an analysis of the input signals at a differing analysis frequency over a substantially narrow bandwidth. Each channel includes multipliers for multiplying the input signals times the sine and times the cosine of a respective analysis frequency. In addition each channel includes low pass filters for each multiplier to provide channel output signals corresponding to the real and imaginary parts of a Fourier transform of the input signals at the analysis frequency of the respective channel.

Each of the channels is sampled in turn to compute the input power spectral density for the input signals and the copower and quadrature power components of cross power. The computation system includes averagers having sets of capacitors and mode control switches with each set corresponding to a differing channel. The mode control switches are actuated to connect each set in feedback relation with the averagers when the associated channel is being sampled. The sampling rate is of large value with respect to the bandwidth. Accordingly, the charge on the sets of capacitors is built up until at the end of analysis, the capacitors are built up to capacitive values corresponding to the input power density and copower and quadrature power components at the analysis frequencies.

Figure 2:
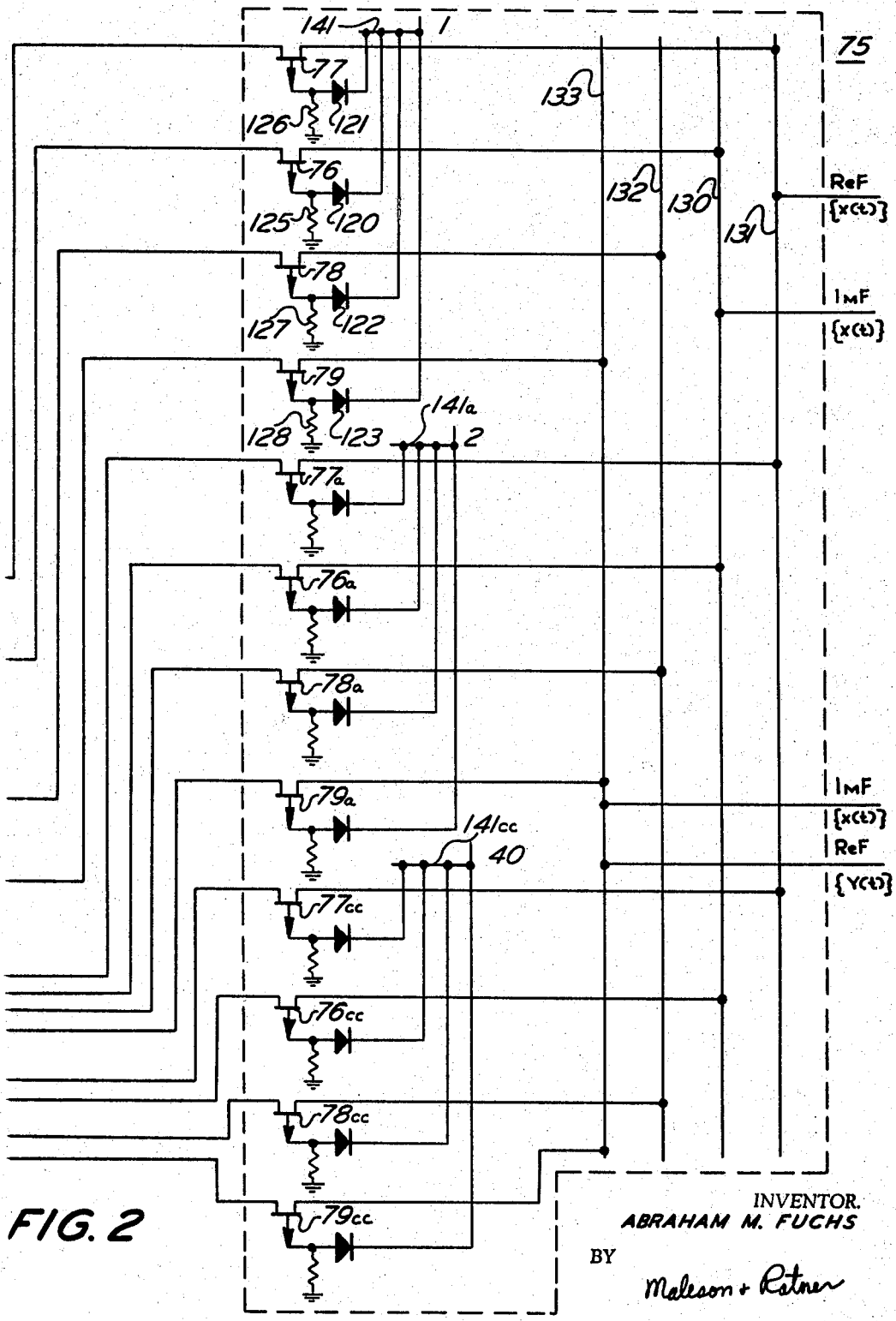
Figure 3:
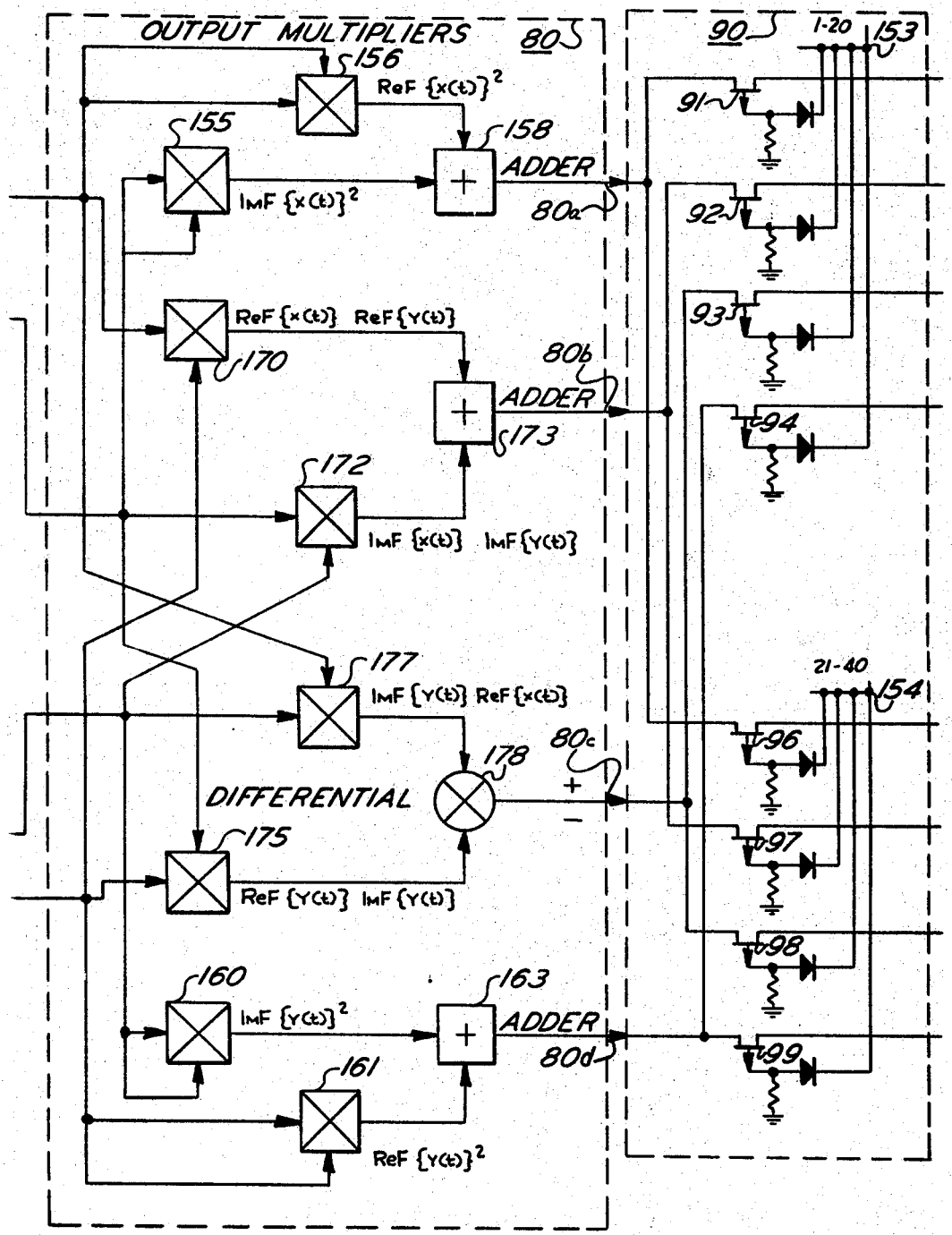
Figure 4:
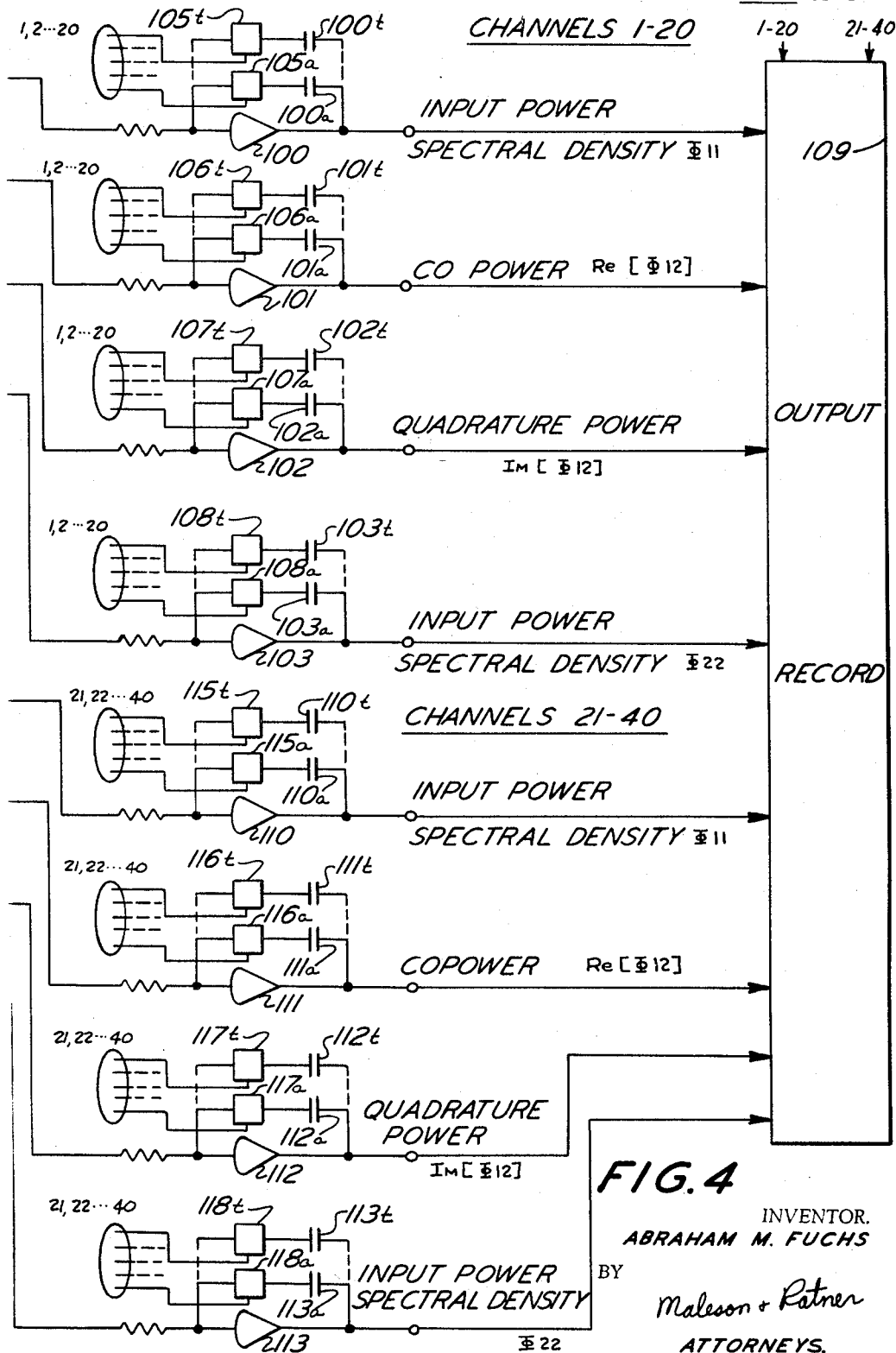

For further objects and advantages of the invention and for a description of its operation, reference is to be had to the following detailed description taken in conjunction with the accompanying drawings in which:

FIGS. 1–4 taken together illustrate a power spectrum analyzer embodying the invention, and FIG. 5 illustrates the manner in which FIGS. 1–4 are taken together.

Referring now to FIGS. 1–4, there is shown a D.C. analog combined power and cross power spectrum analyzer having forty channels of analysis. A power and cross power analyzer for a single channel of analysis is described in detail in patent application Ser. No. 393,435, filed Aug. 31, 1964, by Abraham M. Fuchs and assigned to the same assignee as the present invention, now Patent No. 3,328,686.

The analyzer of FIGS. 1–4 operates on a first time varying input signal $x(t)$ and on a second time varying input signal $y(t)$. Signals $x(t)$ and $y(t)$ may be data from a data logger with the signals first being amplified, band pass filtered, then amplified again and strongly clipped. In this manner, square waves with respect to time are applied to the power and cross power spectrum analyzer by way of inputs 1 and 2. An analysis of how the power spectrum is affected by relative degrees of clipping is contained in an article by J. H. Van Vleck and David Middleton, "The Spectrum of Clipped Noise," Proceedings of the IEEE, volume 54, January 1966, p. 2.

Specifically, inputs 1 and 2 are applied to a buffer amplifier and inverter circuit 50 which is effective to bring the signal level of $x(t)$ and $y(t)$ up to a desired amplitude. Circuit 50 inverts the inputs 1 and 2 to produce first signals $+1$ and $-2$ at output terminals 50a and 50c respectively, and the inverted first input signals $-1$, $-2$ at terminals 50b and 50d respectively. The signals at terminals 50a–d are applied to each of analysis channels 1–40 with each channel corresponding to an anlysis of the input data at a predetermied frequency over a given band width $\pm \Delta w$. A sequential group of forty different analysis frequencies are used which are distributed from the low end to the high end of a desired bandwith as for example, the input band pass filter of a data logger and which may be represented by $w_1$, $w_2 \ldots w_{40}$.

For example, input signals $+1$, $-1$ are applied to the upper half 1A of channel 1 and input signals, $+2$, $-2$ are applied to the lower half 1B thereof. In similar manner, each remaining channel 2–40 also has a pair of upper and lower channels for operating on input signals $+1$, $-1$ and $+2$, $-2$ respectively.

In order to understand the operation of each of channels 1–40 and the subsequent processing of the time varying signals, the following general theoretical basis may be helpful.

As well known, for purposes of general explanation a time varying signal $x(t)$ extending over a period T may be transformed into the frequency domain to derive spectral information by use of a Fourier transform:

(1)
$$F[x(t)] = \int_0^T X(t) e^{-jw_0 t} dt = H(jw_0)$$

Since $e^{-jw_0 t} = \cos w_0 t - j \sin w_0 t$, Equation 1 may be expanded:

(2)
$$\int_0^T x(t) \cos w_0 t\, dt - j \int_0^T x(t) \sin w_0 t\, dt$$
$$= ReF[x(t)] - jImF[x(t)]$$

Since $F[x(t)]$ has real and imaginary parts, the magnitude of the Fourier transform $/F[x(t)]/$ may be expressed:

(3)
$$\sqrt{[RF\{x(t)\}]^2 + [IF\{x(t)\}]^2}$$

The power spectral density of $x(t)$ may be defined as the magnitude of the transfer function of $x(t)$ [Equation 3] squared. Thus, the power spectral density $\phi_{xx}$ of $x(t)$ at a desired analysis frequency $w_0$ for a signal of duration T is obtained by the expression.

(4)
$$\phi_{xx} = \frac{1}{T} / F[x(t)]^2$$

For $y(t)$, as in Equation 3, the magnitude of the Fourier transform may be expressed:

(5) $/F[y(t)]/ = \sqrt{[RF\{y(t)\}]^2 + [IF\{y(t)\}]^2}$

The output power spectral density $\phi_{yy}$ of $y(t)$ is computed by squaring the magnitude of the transfer function of Equation 5:

(6)
$$\phi_{yy} = \frac{1}{T} / F[y(t)]/^2$$

As described in above cited Patent No. 3,328,686, first signal $x(t)$ is applied to an input of each of multipliers 60 and 61 of channel section 1A. Similarly, second signal $y(t)$ is applied to an input of each of multipliers 62 and 63 of channel section 1B. The remaining input of multipliers 60 and 62 have applied thereto the sine waveform of a first of the selected frequencies of analysis, i.e., $w_1$ and the remaining input of multipliers 61 and 63 have applied thereto the cosine waveform of the first selected analysis frequency, $w_1$. Accordingly, multiplier 60 multiplies $x(t)$ times the sine of the first selected analysis frequency $w_1$ to produce a first product signal corresponding to $x(t) \sin w_1 t$. Similarly, multiplier 62 provides a product $y(t) \sin w_1 t$. Further, multipliers 61 and 63 multiply the outputs of terminal 50c and 50d to provide product signals corresponding to $x(t) \cos w_1 t$ and $y(t) \cos w_1 t$ respectively.

It will be understood by those skilled in the art that the output of multipliers 60 and 61 may be expressed as signals comprising both the sum and difference of the frequency of the time varying signal $x(t)$ at the frequency $w_1$. Similarly, the outputs of multipliers 62 and 63 may be expressed as signals comprising both the sum and difference of the frequency of the time varying signal $y(t)$ at the frequency $w_1$.

The outputs of multipliers 60 and 61 are applied to active low pass filters 70 and 72 respectively of section 1A which are effective to pass only a difference frequency component. Specifically, filters 70 and 72 each comprise an operational amplifier having precision resistors and capacitors connected across the amplifier so that each filter exhibits a desired transfer function. Therefore, for example, the output of low pass filter 70 provides an output signal corresponding to the imaginary component of the Fourier transform, as defined in Equation 2 of $x(t)$ viz., $ImF[x(t)]$. Similarly, the output of filter 72 is a signal corresponding to the imaginary component of the Fourier transform of $y(t)$ viz., $ImF[y(t)]$.

The outputs of multipliers 62 and 63 are respectively applied to active low pass filters 72 and 73 of section 1B which are effective to pass only the difference frequency components and are of similar construction to filters 70 and 71. Accordingly, filter 72 is effective to provide an output signal corresponding to the real component of the Fourier transform of $x(t)$ as set forth in Equation 2 viz., $ReF[x(t)]$. Similarly, filter 73 provides an output signal corresponding to the real component of the Fourier transform of $y(t)$ viz., $ReF[y(t)]$. There has thus been described, the output signals provided by the four outputs of low pass filters 70–73.

It will be understood that each of the remaining channels 2–40 includes the identical structure as channel 1. Thus, each of channels 2–40 includes an upper channel section A with dual multipliers and low pass filters and a lower channel section B also with dual multipliers and low pass filters. As in channel 1, the first signal $x(t)$ is applied to each of channel sections 2A–40A and the second signal $y(t)$ is applied to each of channel sections 2B–40B. The sine and cosine of each of the analysis frequencies $w_2$, $w_3$ . . . $w_{40}$ are produced by generator and applied to channels 2, 3 . . . 40 respectively.

Thus, for example, the sine multipliers of channel sections 2A and 2B produce product signals corresponding to $x(t) \sin w_2 t$ and $y(t) \sin w_2 t$ respectively. Additionally, the cosine multipliers of channel sections 2A and 2B provide product signals corresponding to $x(t) \cos w_2 t$ and $y(t) \cos w_2 t$ respectively. The low pass filters of channel sections 2A and 2B provide output signals corresponding to the imaginary and real components of the Fourier transform in the manner described with respect to channel sections 1A and 1B. The operation of the remaining thirty-eight pairs of channel sections may be similarly described.

In this manner, the time varying in part signals 1 and 2 are continuously operated on by channels 1–40. Thus, it will now be understood that in the 40 channels of analysis, each of the two input signals is modulated by the sine and cosine of a respective one of the forty different analysis frequencies. For channel 1, for example, this transfers the energy of the input signal from the region $w_1 \pm \Delta w$ to DC to $+\Delta w$. By the use of a strong low pass filter, there is separated out the components of the modulated signal from DC to $\Delta w$. The multiplication within each of channels 1–40 provides the discriminating of the time varying signals so that separate filters prior to each of the channels are not required. It will be clear that each multiplier and low pass filter combination within each channel section is designed to represent a narrow band width around its respective analysis frequency. The purpose for each of the narrow band widths for each of the analysis frequencies $w_1$, $w_2$ . . . $w_{40}$ will later be described in detail.

The sine and cosine waveform of each of the analysis frequencies may be produced by generator 65 which is based on the use of a chopper stabilized operational amplifier with precision resistors and capacitors being used to establish the frequencies of oscillation. Synchronization of generator 65 is provided by a synchronizer 70 which also applies a signal to the source of inputs 1 and 2. In this manner, the multiplication operation by the multipliers of channels 1–40 may be simultaneous with the initiation of the input signals. It will be understood that the 40 pairs of signals, i.e., 40 sine signals and 40 cosine signals from generator 65 may be very accurately controlled, for example 0.1% frequency.

On the other hand the above defined multiplication by each of channels 1–40 may also be accomplished in the manner described in patent application Ser. No. 606,205 filed Dec. 30, 1966, by Abraham M. Fuchs and Salvatore C. Catania and assigned to the same assignee as the present invention. Accordingly generator 65 is replaced by a master oscillator which produces a train of clock pulses. The clock pulses are applied to a controller including a shift register which generates 40 pairs of switching signals having an ordered pattern in accordance with the sinusoidal waveform of a respective analysis frequency and switching signals having an ordered pattern in accordance with the cosinusoidal waveform of a respective analysis frequency. The sinusoidal switching signals are applied to respective sine multipliers of channels 1–40 and the cosinusoidal waveforms are applied to respective cosine multipliers of each channel. Each of the multipliers includes a resistor switching network and a variable gain device. Accordingly, multiplication of the time varying signals is accomplished by varying the gain of the devices in accordance with stepped sinusoidal waveforms or stepped cosinusoidal waveforms.

The remaining processing of the 40 analysis channels is provided by the sampling system in accordance with the invention. Specifically, the four low pass filter outputs of each channel are applied to switching circuits of an intermediate multiplexer 75 which is effective to connect the outputs of each channel in turn to the multiplication system 80. In this manner, the output of the four low pass filters 70–73 of channel 1 are first applied to multiplier system 80 at the end of a first sample. The outputs of lowpass filters 70–73 are disconnected and the outputs of the four low pass filters of channel 2 representing the analysis of $w_2$ are applied to system 80. This sequential sampling continues until all of the channels have been sampled and then the sampling is repeated beginning in the channel 1.

For example, with channel 1 being sampled, the outputs of filters 70–73 (channel 1 output signals) are connected to multiplier system 80 which produces four outputs 80a–d, which are applied by way of output multiplexer 90 to inputs of sampling average integrators 101–103. Each of the integrators 100–103 are in the operate mode for the first channel in which a first set of feedback capacitors 100a–103a is connected across integrators 100–103 respectively. The remaining sets of feedback capacitors 100b–100t, 101b–101t, 102b–102t and 103b–103t are in the hold mode in which they are disconnected from the input of integrators 100–103 respectively. In this manner, during the time duration of a sampling period at the frequency $w_1$, capacitors 100a–103a begin to store a charge in accordance with the computation of the input power spectral density of signal 1, copower, quadrature power and input power spectral density of signal 2. The operation of mode control switching is described in detail in Electronic Analog and Hybrid Computors, McGraw-Hill, 1964, p. 373 et. seq.

At the end of the first sampling period for channel 1, multiplexer 75 is actuated to connect the four low pass filters of channel 2 to system 80. At the same time, the mode control switches for integrators 100–103 are actuated so that switches 105a–108b are open and 105b–108b are in their closed circuit position. Thus, the first set of feedback capacitors 100a–103a are placed in hold mode at their last value and the integrators have a second set of feedback capacitors 100b–103b connected in their operate mode during the second sampling period. In this manner, during the second sample, representing analysis frequency $w_2$, capacitors 100b–103b build up values equivalent to the respective outputs of channel 2. At the termination of the second sampling period, a third sampling is initiated for channel 3 representing analysis at frequency $w_3$ with capacitors 100c–103c being charged in accordance with the respective outputs of channel 2. This sequential sampling process is repeated in turn channel by channel for channels 4–20.

For the 21st channel, output multiplexer 90 is actuated so that outputs 80a–d are applied to inputs of integrators 110–113, each having sets 21–40 of feedback capacitors similar in structure and operation to that of integrators 100–103. Accordingly, the sampling process is repeated in turn for channels 21–40 for buildup of charge on the respective sets of feedback capacitors 100a–110t, 111a–111t, 112a–112t, and 113a–113t. In this manner, during sample periods 21–40, the corresponding capacitors charge up as indicated by the respective computation of channels 21–40 to provide the input power spectrum of input 1, copower, quadrature power and the input power spectrum of input 2 respectively.

After channel 40 has been sampled, the sampling process repeats with the sampling of channels 1–40. Thus, during the second sampling, the forty sets of four capacitors are increased in stored charge. With subsequent samplings the capacitors are built up to values corresponding to the forty values of power spectrum of input signals 1 and 2 and the copower and quadrature power components of cross power at the 40 analysis frequencies $w_1$–$w_{40}$. The outputs of the averager-integrators are applied to an output record system which may comprise a scanner for sequentially reading the forty values and applying each signal in turn to an analog-to-digital convertor to feed a tape recorder of the digital type.

It will be understood that the rate of sampling channels 1–40 is maintained at a sufficiently high value to ensure that the low pass filter outputs are adequately described by the sampling. As previously described, each multiplier and low pass filter combination of each channel 1–40 represents a narrow bandwidth. Thus, the sampling may be mathematically valid if the sample rate is of a substantially large magnitude with respect to the bandwidth. For example, there may be provided more than four samples per maximum frequency in the filter outputs.

In a particular embodiment of the invention, it may be assumed that a three-second period is available for each channel for a short settling time and that the minimum length of a signal is three seconds. As understood by those skilled in the art, there are two components of the input signal being analyzed. These two components are the random components and the periodic components. Thus, if it is assumed that the lowest analysis frequency, $w_1$ is 560 c.p.s., the periodic component is actively evaluated even during a substantially short analysis time. On the other hand, the analysis of the random component is more difficult as a result of the narrow bandwidth. It can be shown that for a typical system, a minimum bandwidth may be plus or minus 3 c.p.s. for the statistical requirement. Such a bandwidth provides a usable statistical accuracy for random signals and provides excellent results for periodic signals. Thus, it will now be understood that with forty analysis frequencies $w_1$–$w_{40}$, and with a ±3 c.p.s. bandwidth there is provided a complete coverage of 240 c.p.s. In addition, in view of the foregoing, the sampling time per channel 1–40 is precisely set so that it provides a predetermined gain factor to the overall result.

With the above understanding of the operation of the spectrum analyzer of the invention, there will now be described the specific operation of multiplexers 75 and 90 and multiplication system 80. In order to sequentially apply the outputs of channels 1–40 to system 80, intermediate multiplexer 75 comprises forty stages of four switching circuits each. Specifically, the outputs of filters 70–73 are connected to the source terminal of switching transistors 76–78 respectively. Similarly, the corresponding filter outputs of channel 2 (not shown) are connected to the source terminals of switching transistors 76a–79a. The same correspondence occurs for each of the remaining channels, each of which connected to four differing transistors until for the fortieth channel, the filter outputs are connected to the source terminals of transistors 76cc–79cc. In a typical example, all of the foregoing transistors may be silicone field effect transistors of the N channel type.

In order to provide a single four-terminal output, of multiplexer 15, there are provided four output buses 130–133. The drain terminals of transistors 77, 77a, etc. are connected to bus 131, the drain terminals of transistors 78, 78a, etc. are connected to bus 132 and the drain terminals of transistors 79, 79a, etc. are connected to bus 133. The gate terminal of each of transistors 76–79 is connected by way of the anode and cathode of a respective diode 120–123 to a common junction 141. It will be understood that upon application of a negative going signal to junction 141, diodes 120–123 are turned on, thereby to apply a negative potential to the gate terminals and to turn off their respective transistors. On the other hand, upon application of a positive going or ground potential to junction 141, diodes 120–123 are turned off and therefore, the gate terminals of transistors 76–79 are connected to ground by way of resistors 125–128 respectively. The remaining switching transistors of the channels 2–40 have similar diode elements and resistors connected to junctions 141a–141cc respectively.

Thus, in order to provide a sampling of the channels, a positive going pulse is applied in turn to each of junctions 141–141cc for the time duration of a sampling period with a negative going signal being applied to the remaining junctions. The sequential scanning of the channels by a positive going pulse is provided by a binary counter 150 which is synchronized by synchronizer 66 and having its outputs connected to a decoder 152. As well known in the art and as described in Millman and Taub, Pulse, Digital and Switching Waveforms, McGraw-Hill, 1965, a counter and decoder system may operate to provide a positive going pulse on one and only one of forty outputs. Thus outputs 1–40 of decoder 152 are connected to junctions 141–141cc. In addition, decoder 152 provides a positive going pulse at output 152a during the time that a positive going pulse is being produced at any one of decoder output 1–20. Output 152b provides a positive going output pulse when a positive going pulse appears at any one of the outputs 21–40.

Outputs 152a and 152b of decoder 152 are used to switch output multiplexer 90. Specifically, output 152a is connected to a junction 153 associated with switching transistors 91–94 while output 152b is connected to junction 154 associated with switching transistors 96–99. Outputs 80a–80d of multiplication system 80 are applied to the source terminals of transistors 91–94 respectively and to the source terminals of transistors 96–99 respectively. The drain terminals of transistors 91–94 are connected to averager integrators 100–103 respectively and the drain terminals of transistors 96–99 are connected to averagers 110–113 respectively. The foregoing transistors are similar in structure and operation as those described with respect to multiplexer 75.

Accordingly, upon aplication of a positive going pulse to terminal 153, the diodes associated with each of transistors 91–94 are turned off and the transistors are turned on. At the same time that a positive going pulse is applied to terminal 153, a negative going pulse is applied to terminal 154 which is effective by way of the respective diodes to turn off transistors 96–99. In this manner, with one of the channels 1–20 being sampled, outputs 80a–d of multiplication system 80 are applied to inputs of averagers 100–103 respectively. On the other hand, when channels 21–40 are sampled, a positive going pulse is applied to junction 154 and a negative going pulse to junction 153, so that transistors 96–99 are turned on and the outputs of multiplication system 80 are applied to the respective inputs of averagers 110–113.

The proper feedback capacitors are connected in the operate mode for integrators 100–103 and 110–113 by utilizing mode control switching signals from decoder 152. Specifically, each of the feedback capacitors has one end connected to an output of its respective integrator and its other end connected to one side of a mode control switching network. The other side of the switching circuit is connected to the input of the integrator.

For example, integrator 100 has capacitors 100a–t each having one end connected to the ouput of the integrator and the other end of the capacitor connected to one side of switching circuits 105a–t respectively. Switching circuits 105a–t may be comprised of field effect transistors having a resistor-diode network as previously described with respect to multiplexer 75 and 90. Switching signals 1–20 from decoder 152 are applied to switching circuits 105a–t respectively. Thus, during the first sampling interval, capacitor 100a is connected across integrator 100 and capacitor 100a charges up in accordance with the computation of channel 1 for the input power spectrum of the first signal at $w_1$.

Similarly, outputs 1 to 20 of decoder 152 are applied to mode control switching circuits 106a–t respectively, 107a–t respectively and 108a–t respectively. In this manner, averagers 100–103 have 20 sets of feedback capacitors which build up capacitor values when their respective computation channel is sampled. In similar manner, averagers 100–113 have 20 sets of feedback capacitors with each capacitor having an individual mode control switching circuit. Specifically, outputs 21 to 40 of decoder 152 are applied to the following switching circuits of averages 110–113: switching circuits 115a–t respectively, switching circuits 116a–t respectively, switching circuits 117a–t respectively and switching circuits 118a–t respectively. In this manner, when channels 21–40 are sequentially sampled, the respective capacitors of averagers 110–113 are built up in capacitive value in accordance with the output of multiplier system 80.

Now that the switching sequences of multiplexers 75 and 90 and the capacitor switching has been explained, a detailed description of the single multiplication system 80 will be given. As previously described the outputs of channels 1–40 appear in sequence at buses 130–133. In order to compute input power spectral density for input signal 1, viz, $x(t)$, buses 130 and 131 are applied to squaring circuits 155 and 156 respectively. The squared outputs are summed by adder 158 with the resultant signal being applied by way of output 80a to averager-integrator 100 or 110 depending on which channel is being sampled. Accordingly, the output of adder 158 is integrated by one of the averaging circuits 100, 110, thereby building up a charge on a respective capacitor 100a–t, 110 a–t.

Similarly, for signal input 2, the output power spectral density for $y(t)$ may be computed in the following manner. The outputs of buses 132 and 133 are applied to squaring circuits 160 and 161 respectively. The squared outputs are summed by adder 163, the output of which is applied by way of output 80d through multiplexer 90 to either averager integrator 103 or 113, depending on the channel being sampled.

In order to compute the copower or in phase spectrum of $x(t)$ and $y(t)$, the signals on buses 131 and 133 are multiplied together by multiplier 170 to form a product. In addition, the outputs of buses 130 and 132 are multiplied together by multiplier 172 to form another product. The two products are adder 173 and applied by way of output 80b either to averager integrator 101 or 111.

The quadrature or out of phase power spectrum of $x(t)$ and $y(t)$ is derived by multiplying the outputs of buses 130 and 133 by multiplier 175 and by multiplying the outputs of buses 131 and 132 by multiplier 177. The first product is substracted from the second product by means of a differential circuit 178 with the resultant signals being applied by way of output 80c to either averager integrator 102 or 112.

It will be understood by those skilled in the art that cross power spectral density $\phi xy$ may be computed from the copower and quadrature power components in the following manner. The copower and quadrature power signals are each respectively squared with the resultant signals being summed and then the square root is taken. The resultant signal is proportional to the magnitude of the cross power spectral density.

It will now be understood, that in accordance with the invention, the forty sets of four capacitors are built up to values corresponding the forty values of power spectrum of the first and second input signals and their co-power and quad power components of cross power at the forty analysis frequencies $w_1$–$w_{40}$. The sampling of the channels is valid since a substantially low signal frequency is being operated on and the final process is an integration. By the use of the above described substantially high sampling rate, the results of the computation are as valid as if a continuous monitoring of all the low pass filters of each of the channels 1–40 was provided. Accordingly, a substantial decrease in the resultant structure is provided in which only eight multipliers are needed instead of forty sets of eight multipliers. In addition, only eight integrators have been used instead of forty sets of four integrators.

While forty channels have been used, any other large plurality of channels of frequency analysis may also be utilized with the necessary changes being made in the number of switching circuits.

What is claimed is:

1. A power spectrum analyzer for first and second time varying input signals having a large plurality of channels of analysis with each channel corresponding to an analysis of said first and second input signals at a differing analysis frequency over a predetermined substantially narrow band width comprising,
   each channel including multiplier means (1) for multiplying said first and second input signals times the sine of a respective analysis frequency and (2) for multiplying said first and second input signals times the cosine of a respective analysis frequency, low pass filter means for each channel for averaging the output signals of the respective multiplier means to provide channel output signals corresponding to the imaginary and real parts of a Fourier transform of the first and second signals at the analysis frequency of the respective channel,
   means for computing the input power spectral density of said first and second signals and the copower and quadrature power components of cross power spectral density, said computing means including averaging means having a large plurality of capacitor means each corresponding to a differing one of said channels and switchable to connect each capacitor means in turn in feedback relation with said averaging means,
   sampling means including a plurality of switching devices connected to said low pass filter means of each channel and operable for applying said channel output signals of each channel in turn channel by channel to said computing means for a predetermined sampling period, and
   means for applying switching signals to said switching devices and to said capacitor means for sequentially sampling said channels at a rate which is of large value with respect to said band width thereby to build up the charge on the corresponding capacitor means until at the end of analysis said capacitor means are built up to capacitive values corresponding to said input power density and copower and quadrature power components at said analysis frequencies.

2. The analyzer of claim 1 in which for each channel said multiplier means and said low pass filter means provide said narrow bandwidth on either side of the respective analysis frequency.

3. The analyzer of claim 1 in which said multiplier means for each channel comprises two multipliers associated with the sine and two multipliers associated with the cosine of the respective analysis frequency, and each of said multipliers providing the discriminating of the first and second signals at the respective analysis frequency.

4. The analyzer of claim 3 in which said averaging means comprises two groups of four averager-integrators and in which substantially half of said capacitor means are associated with each of said groups.

5. The analyzer of claim 4 in which said computing means comprises eight multipliers for multiplying differing channel output signals of each channel during said sampling period.

6. A power spectrum analyzer for first and second time varying input signals having a large plurality of channels of analysis with each channel corresponding to an analysis of said first and second input signals at a differing one of a sequential group of analysis frequencies comprising,
   each channel including (1) first and second multiplier means for multiplying said first and second input signals respectively times the sine of a corresponding analysis frequency to produce first and second product signals respectively and (2) third and fourth multiplier means for multiplying said first and second input signals respectively times the cosine of a corresponding analysis frequency to produce third and fourth product signals respectively,
   each channel including low pass filter means for each of said multiplier means (1) for averaging said first and second product signals to provide channel output signals corresponding to the imaginary part of a Fourier transform of said first and second signals respectively at the analysis frequency of the respective channel and (2) for averaging said third and fourth product signals to provide channel output signals corresponding to the real part of a Fourier transform of said first and second input signals respectively at the analysis frequency of the respective channel,
   means including multiplication system means for computing the input power spectral density of said first and second signals and the copower and quadrature power components of cross power spectral density, said computing means including a plurality of averagers having a large plurality of sets of storage means with each set corresponding to a differing one of said channels, switching means for each of said sets operable for connecting its respective set in circuit with associated averagers,
   sampling means including a plurality of switching devices connected to said low pass filter means of each channel and operable for applying said channel output signals of each channel in turn channel by channel to said multiplication system means for a predetermined sampling period, and
   means for applying switching signals to said switching devices and to said switching means for sequentially sampling said channels while connecting in circuit only the storage means associated with the channel being sampled thereby to increase the value of the storage in said sets until at the end of analysis, said stored values in said sets of storage means correpond to said input power density and copower and quadrature power components at said analysis frequencies.

7. The analyzer of claim 6 in which for each channel each multiplier means and associated filter means represents a substantially narrow bandwidth about the respective analysis frequency.

8. The analyzer of claim 7 in which said switching signal means is effective to switch said switching devices at a sampling rate which is of large value with respect to said bandwidth.

9. The analyzer of claim 6 in which each said set of storage means comprises a set of capacitors and each said switching means comprises mode control switches operable for connecting said set of capacitors in feedback relation with the associated averager.

10. The analyzer of claim 9 in which there are provided two groups of averagers with each group having associated therewith substantially half of said sets of capacitors.

11. The analyzer of claim 10 in which said switching devices each comprise a switching transistor connected to a respective low pass filter means, and each transistor having an output terminal connected to a corresponding input terminal of said multiplication system means.

References Cited

UNITED STATES PATENTS 3,217,251  11/1965  Andrew.

RUDOLPH V. ROLINEC, Primary Examiner.

P. F. WILLE, Assistant Examiner.

U.S. Cl. X.R.

179—1